United States Patent Office 3,100,962
Patented Aug. 20, 1963

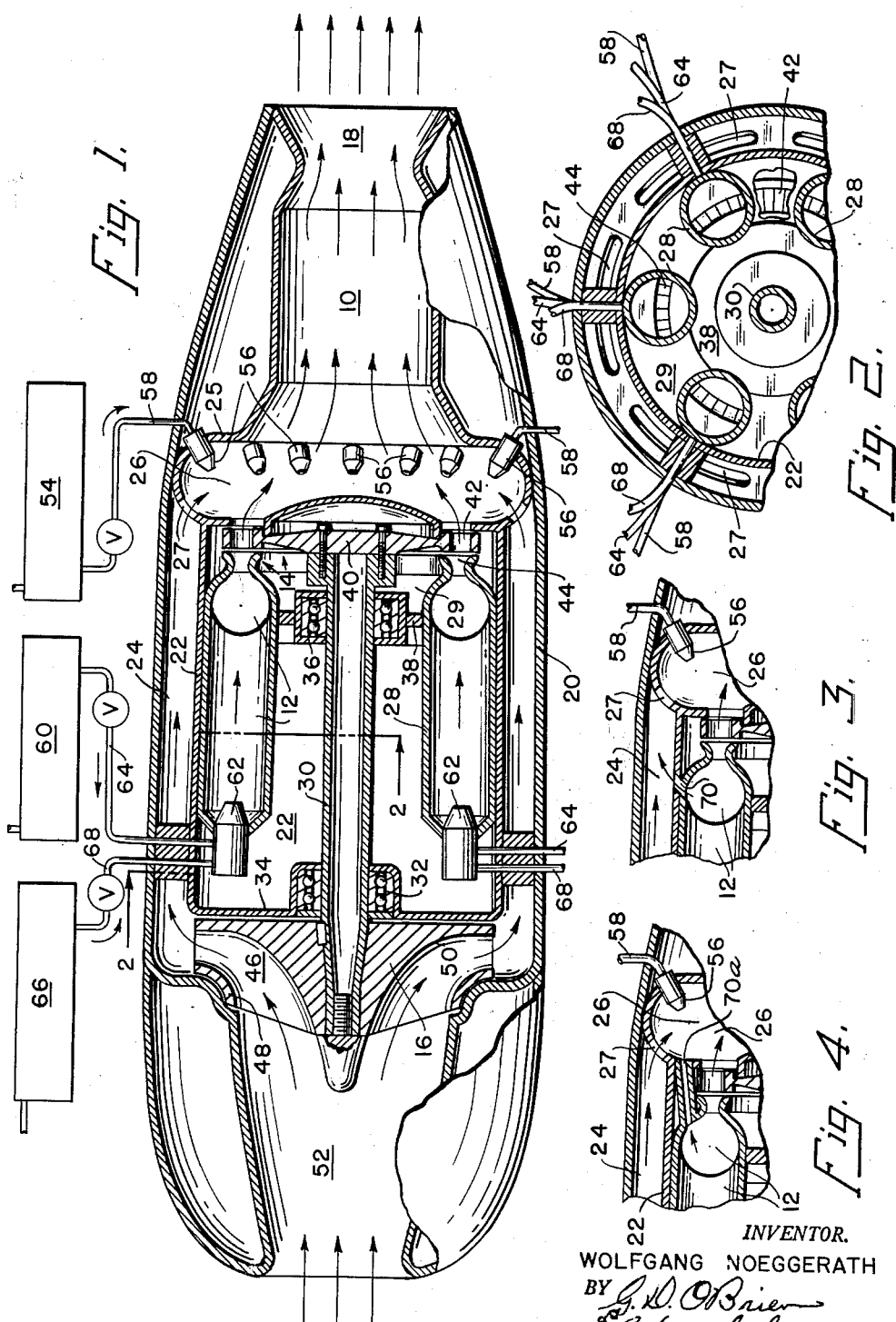

3,100,962
TURBO-AIR-ROCKET ENGINE
Wolfgang C. Noeggerath, 4625 N. Rio Hondo Parkway, El Monte, Calif.
Filed Oct. 21, 1952, Ser. No. 316,111
2 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates in general to propulsion devices for vehicles of the class adapted to be propelled through air and more particularly to improvements in the jet propulsion type.

Air vehicle propulsion devices may be readily compared by arranging them in such manner that their characteristics will vary between ends of a series. For example, the propulsion types of present major importance may be considered as: Motor-propulsion, turbojet, liquid fuel rocket and solid fuel rocket. In this series, in the order named, these types become increasingly favorable in the characteritsics of attainable flight velocity, simplicity of construction and operation, volume, and cost of installation, but decreasingly favorable in the characteristic of duration of operation. The desired operational characteristics of an air vehicle will, of course, dictate which of these types will be employed. It is well known that the difference between the first two named types is relatively small, the present turbojet propelled aircraft, for example, being a progressive development of the propeller propelled aircraft. When comparing the turbojet and rocket types, however, the operational characteristics become relatively large, the fuel consumption of the rocket type being of the order of twenty times that of the turbojet at comparable flight velocities.

The series referred to is, of course, illustrative only, it being recognized that certain mixed types have been employed such as the propeller-turbojet unit which has characteristics intermediate the first two named types and also the rocket type employed with either of the first two named types but only as an auxiliary unit, usually for assisting the take-off of an aircraft. It is apparent, therefore, that none of the types mentioned provide propulsion units which continuously operate utilizing turbojet and rocket principles. It is also apparent that such a unit having operational characteritics in the gap between the turbojet and rocket would provide the air vehicle designer with a new means of propulsion for applying same to desired vehicles having operational characteristics intermediate the turbojet and rocket. An example of such vehicle would be an interceptor aircraft with a velocity in excess of the turbojet aircraft but with a relatively short duration of flight, but sufficient to accomplish its mission.

One of the objects of the invention is to provide a jet propulsion unit which employs compressed ambient air for burning fuel delivered to a main or jet combustion chamber and an oxidant carried by the unit for burning fuel delivered to a turbine combustion chamber.

Another object is to burn and exhaust products of combustion from a jet combustion chamber without passing same through the turbine blading.

Another object is to employ combustion temperatures in a jet combustion chamber which exceeds the temperatures which the turbine blading would operationally withstand.

Another object is to deliver an overrich fuel mixture to a turbine combustion chamber to thereby lower the temperature of products of combustion delivered to the turbine blading and subsequently burn any remaining fuel exhausted by the turbine blading in a jet combustion chamber with compressed ambient air.

A further object is to provide novel methods of burning fuel to produce jet propulsion.

Still further objects and many of the attendant advantages of this invention will be readily appreciated as the same becomes better understood by reference to the following detailed description when considered in connection with the accompanying drawings wherein:

FIG. 1 is a longitudinal central section through the subject of the invention, portions being broken away and other portions shown in side elevation;

FIG. 2 is a section taken on line 2—2, FIG. 1.

FIG. 3 is a detail of an alternative form of the invention; and

FIG. 4 is a detail of another alternative form of the invention.

Referring in detail to the drawing, the subject of the invention comprises, in general, a main or jet combustion chamber 10, a turbine combustion or rocket reaction chamber 12, a turbine 14 driven by gas delivered from the turbine chamber, an air compressor 16 driven by the turbine, and a thrust nozzle 18 through which products of combustion from both chambers issue in a rearward direction to effect forward thrust of the unit.

In further detail, the invention comprises an outer tube 20 and an inner tube 22, forming an annular air duct 24 therebetween. A casing 25 forming a mixing chamber 26 communicating with jet combustion chamber 10 is disposed rearwardly of the air duct and communicates therewith by apertures 27. A plurality of angularly spaced turbine combustion tubes 28 are disposed within tube 22 and communicate at their rear ends with a toroidal shaped turbine combustion manifold 29, this manifold and the tubes associated therewith forming the turbine combustion chamber 12 previously referred to.

A shaft 30 is rotatably supported by a bearing 32 carried by wall 34 at the forward end of tube 22, and a bearing 36 carried by a bearing support member 38 secured at its outer edge to tubes 28. A turbine rotor 40 is secured to the rear end of shaft 30, its outer periphery having turbine blades 42 through which issue products of reaction delivered from angularly spaced nozzles 44 affixed to the turbine combustion manifold.

The air compressor 16, of the radial flow centrifugal type having a plurality of angularly spaced radially extending vanes 46, shrouded front and rear by shrouds 48, 50, respectively, is secured to the forward end of shaft 30. It is to be understood that this type is exemplary only and that axial or mixed flow types may be employed if desired. A diffuser 52 is disposed ahead of the air compressor for receiving ambient air, increasing its static head, and delivering it to the compressor to be compressed thereby and delivered to air duct 24 and thence to mixing chamber 26 through apertures 27.

Any suitable liquid fuel, such as fuel oil, is delivered from fuel tank 54 to a plurality of main fuel nozzles 56, these all being connected by any suitable manifold to pipe 58. Liquid fuel is similarly delivered from fuel tank 60 to rocket propellant injectors 62 through pipe 64 and a liquid oxidant is similarly delivered from tank 66 to the injectors through pipe 68. The various tanks may be pressurized by gas to effect delivery of liquid or, alternatively, suitable pumps may be employed to pump and meter the liquids to the fuel nozzles and injectors. As illustrated, the tanks may be considered as pressurized and the liquids metered as desired through suitable valves V or without valves and directly at the injectors. It will be understood, however, that pumps are equally contemplated and whether pumps, pressurized tanks or a combination thereof are to be employed will be dictated by the particular requirements of the unit.

In the operation of the device ambient air enters the forward end of diffuser 52 at high velocity, increases in static head at the rear end of the diffuser, is compressed to higher pressure by air compressor 16 and delivered through duct 22 to mixing chamber 26 where nozzles 56 add fuel to the air, the mixture burning in the main or jet combustion chamber 10 and exhausting through thrust nozzle 18. Liquid oxidant and liquid fuel are delivered from tanks 66 and 60, respectively, to injectors 62 and burn in turbine combustion chamber 12, the products of combustion being delivered through nozzles 44, through turbine blades 42, and thence to jet combustion chamber 10, the turbine driving the compressor.

The liquid fuel in tank 60 may be the same as in tank 54 in which event a single tank may be employed if desired or it may be a different fuel, for example, a rocket fuel.

Examples of rocket fuels which may be employed are fuel oil, hydrazine, alcohol, and aniline and other fuels employed in liquid propellant rockets or mixtures thereof, with oxidants such as nitric acid, fuming nitric acid, high percentage hydrogen peroxide (80–90%), liquid oxygen, nitrous oxide, etc. Mono-propellants such as hydrogen peroxide (decomposition of same), nitro-methane or hydrazine may also be employed in lieu of bipropellants. When hydrogen peroxide is employed, it may be introduced into the turbine combustion chamber as illustrated or decomposed prior thereto and delivered to the combustion chamber for reaction with a fuel. As hereinafter referred to in the appended claims a "rocket propellant" is to be construed as any propellant either a mono-propellant or bipropellant, which generates energy by a chemical reaction without use of ambient air.

Certain of the differences of this invention from the turbojet and rocket and the advantages which stem therefrom will now be described.

In this invention, when an oxidant pump is employed, only a relatively small proportion of the net output of the power plant is employed to supply liquid oxidant to the turbine chamber, whereas in the turbojet a relatively large proportion of its net output must be employed to supply its turbine combustion chamber with compressed ambient air. When the oxidant supply is pressurized, thus eliminating an oxidant pump, it will be apparent that none of the net output is employed to supply the liquid oxidant. The pressure ratio across the turbine is not limited, as in the turbojet, and hence it will be apparent that higher thermodynamic efficiencies are possible. Since the gases exhausted from the main or jet combustion chamber do not pass through the turbine blading, as in a turbojet, the temperatures in the jet combustion chamber are not limited by materials which turbojet blading would operationally withstand. The increase in temperature and pressure levels of this process with the use of a liquid oxidant effects another increase in thermodynamic efficiency and is reflected in a considerable decrease in size and weight of the unit. As a result of the foregoing the efficiencies of certain individual components becomes less critical resulting, for example, in simplified and more economically manufactured compressor and turbine blading. Part load performance will be improved, and the turbine may be started without special starting devices since its operation is independent of the air compressor and ambient air. Since the operation of the turbine is not affacted by altitude, as in the turbojet, it will be apparent that the performance of the entire unit will be less affected by altitude. Ignition in the jet combustion chamber is also more favorable than in the turbojet since the exhaust gases from the turbine contain considerable heat which may be utilized to vaporize the fuel in the mixing chamber and thus aid in initiating the reaction in the jet combustion chamber.

In the invention so far described, all of the gas exhausted from the turbine combustion chamber passes through the turbine blading. An alternative form of the invention is illustrated in FIG. 3 wherein a portion of this gas is bled through ducts 70 into air duct 24, mixing with the air therein prior to its delivery to mixing chamber 26 and thus adding heat thereto to promote subsequent combustion after adding fuel thereto in the mixing chamber. Another alternative form of the invention is illustrated in FIG. 4 wherein a portion of the gas exhausted from the turbine combustion chamber bypasses the turbine blading through ducts 70a, and is delivered to a zone adjacent mixing chamber 26 to promote ignition and combustion. It will be apparent, also, that both of the alternative forms just described may be employed in combination.

Obviously many modifications and variations of the present invention are possible in the light of the above teachings. It is therefore to be understood that within the scope of the appended claims the invention may be practiced otherwise than as specifically described.

What I claim is:
1. A jet propulsion device, comprising:
   (a) an air compressor adapted to receive and compress ambient air,
   (b) a gas turbine drivingly connected to the air compressor for operating the latter,
   (c) a rocket propellant reaction chamber constructed to deliver products of combustion generated therein to the turbine in such manner that the turbine exhaust is a substantially annular stream surrounding the axis of rotation of the turbine,
   (d) means for delivering rocket propellant to said reaction chamber for reaction therein and delivery to the turbine,
   (e) a mixing and ignition chamber disposed rearwardly and adjacent the turbine having an annular zone in which ignition and mixing are initiated,
   (f) an annular channel surrounding the reaction chamber adapted to deliver the compressed air to an annular outer portion of said zone and thence radially inwardly,
   (g) means for delivering fuel to said mixing and ignition chamber at angularly spaced points therearound for impinging into the direction of discharge of the compressed air into said zone, said annular exhaust stream from said turbine also being directed into said annular zone, whereby fuel and air are mixed and maintained ignited in said zone by the turbine exhaust to provide initial combustion,
   (h) a combustion chamber disposed rearwardly of the mixing chamber in which the combustion aforesaid is completed,
   (i) and a thrust nozzle forming a rearwardly directed continuation of the combustion chamber for producing thrust.
2. A device in accordance with claim 1 including means for delivering a portion of the gas produced in said reaction chamber upstream of said zone, without passing same through the turbine, said portion being at a greater temperature than the turbine exhaust.

References Cited in the file of this patent

UNITED STATES PATENTS

| | | |
|---|---|---|
| 2,411,552 | New | Nov. 26, 1946 |
| 2,531,761 | Zucrow | Nov. 28, 1950 |
| 2,592,938 | McNaught | Apr. 15, 1952 |
| 2,620,625 | Phaneuf | Dec. 9, 1952 |

FOREIGN PATENTS

| | | |
|---|---|---|
| 920,387 | France | Jan. 4, 1947 |